Dec. 2, 1924.  
G. F. EDMONDS  
SLED BRAKE  
Filed May 31, 1922

1,517,967

G. F. Edmonds
INVENTOR

BY Victor J. Evans
ATTORNEY

WITNESS:

Patented Dec. 2, 1924.

1,517,967

UNITED STATES PATENT OFFICE.

GEORGE F. EDMONDS, OF LEAVENWORTH, KANSAS.

SLED BRAKE.

Application filed May 31, 1922. Serial No. 564,867.

*To all whom it may concern:*

Be it known that I, GEORGE F. EDMONDS, a citizen of the United States, residing at Leavenworth, in the county of Leavenworth and State of Kansas, have invented new and useful Improvements in Sled Brakes, of which the following is a specification.

This invention relates to sleds, and has particular application to a brake, which is normally held in a folded position against the underside of the sled body, and automatically moved to an active position incident to its release.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
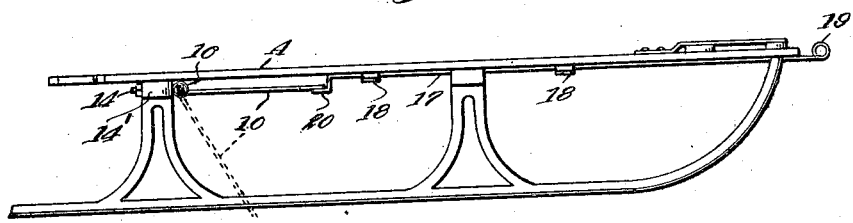
Figure 1 is a side elevation of a sled equipped with the brake forming the subject matter of the invention, the normal position of the brake being illustrated by full lines and its active position indicated by dotted lines.
Figure 2:
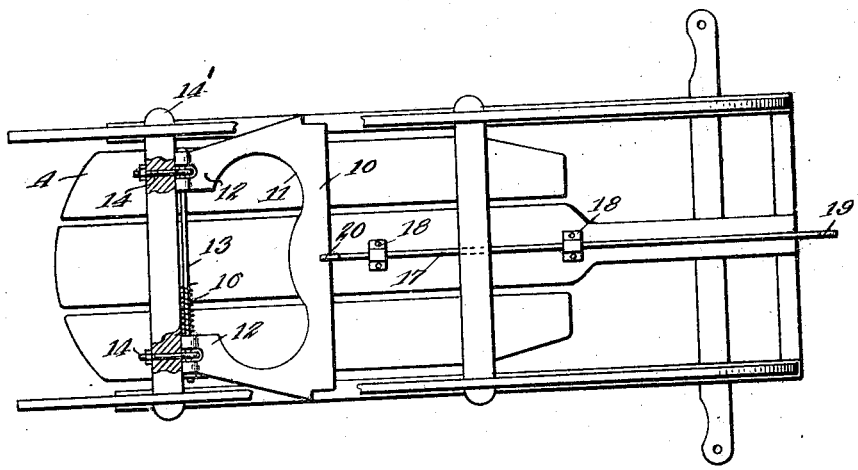
Figure 2 is a sectional view through the sled showing the brake and its associated parts in plan.

Referring to the drawing in detail, A indicates a sled of any well known construction and with which the brake forming the subject matter of the present invention is adapted for use.

The brake proper is indicated at 10, and consists of a plate of any suitable material which is cut away as at 11, and the separated portions 12 are connected together by a rod 13. This rod is rotatably supported by eye bolts 14 which extend through the usual cross member 14' of the sled construction, and consequently the brake member 10 is susceptible of being swung to a horizontal position immediately beneath and parallel with the sled body as illustrated by full lines in Figure 1, which position it occupies when not in use. Again, the brake element is susceptible of being lowered to the position illustrated by dotted lines in Figure 1 to engage the snow or icy surface to check the progress of the sled. It will be noted that the braking element 10 is of a size to operate between the runners of the sled, and to assume an inclined position with relation to the sled body when it is lowered to a position for use, the lower corners of the brake member, in such lowered position, engaging against and resting upon the runners so as to brace the brake member and limit its movement in a downward and rearward direction. Surrounding the rod 13 is a coiled spring 16 which engages the braking element 10 to automatically throw the latter to an active position incident to its release from the latch utilized to hold the braking element normally in a folded position parallel with the sled body. This latch consists of a rod 17 which slides beneath the sled body in suitable brackets 18, the forward extremity of the rod terminating to provide a finger engaging loop 19 which projects immediately in advance of the sled, while the opposite end of this rod is offset as at 20 to underlie the adjacent end of the braking element when the latter is folded. Manifestly, when the rod 17 is moved forwardly, it releases the braking element 10 and the latter is automatically thrown to an active position under the influence of the spring 16.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. The combination with a sled, of a brake element pivoted beneath the sled and adapted to be arranged in a horizontal position when not in use, a latch element slidable longitudinally of the sled body and having an offset extremity arranged to engage the brake element to hold it in an inactive position, and means for automatically swinging the brake element to an active position to contact the ground incident to its release.

2. The combination with a sled comprising a top and runners supporting the top, of a brake member pivoted beneath the top, and means normally supporting the said member in an elevated position extending beneath the said top, the said member being movable, when released by the retaining means, to a downwardly and forwardly inclined position with its lower corners resting upon the said runners of the sled.

3. The combination with a sled comprising a top and runners supporting the top, of a brake member pivoted beneath the top and movable to a position lying beneath the top and to a lowered position inclined downwardly and forwardly and with its lower corners resting upon the runners whereby rearward swinging movement of the brake member under braking conditions is limited by reason of such engagement, and manually releasable means for retaining the said brake member in the elevated first mentioned position.

4. In combination with a vehicle, a gravity actuated ground engaging means carried by the vehicle and normally supported out of engagement with the ground, and a sliding element carried by the vehicle for supporting the ground engaging means out of engagement with the ground.

5. In combination with a body, a ground engaging element carried thereby and means slidably mounted on the body adapted to cooperate with the ground engaging element for supporting same in inoperative position.

6. In combination with a body, a ground engaging element pivotally mounted on the body and a bar slidably associated with the ground engaging element for supporting same in inoperative position.

7. A sled of the class described comprising a body, a ground engaging element carried by the body, a bar slidably associated with said ground engaging element for supporting same in inoperative position and means for actuating said bar to release said ground engaging element.

In testimony whereof I affix my signature.

GEORGE F. EDMONDS.